Nov. 19, 1929.  C. C. FARMER  1,736,000
ANGLE COCK DEVICE
Filed April 9, 1928
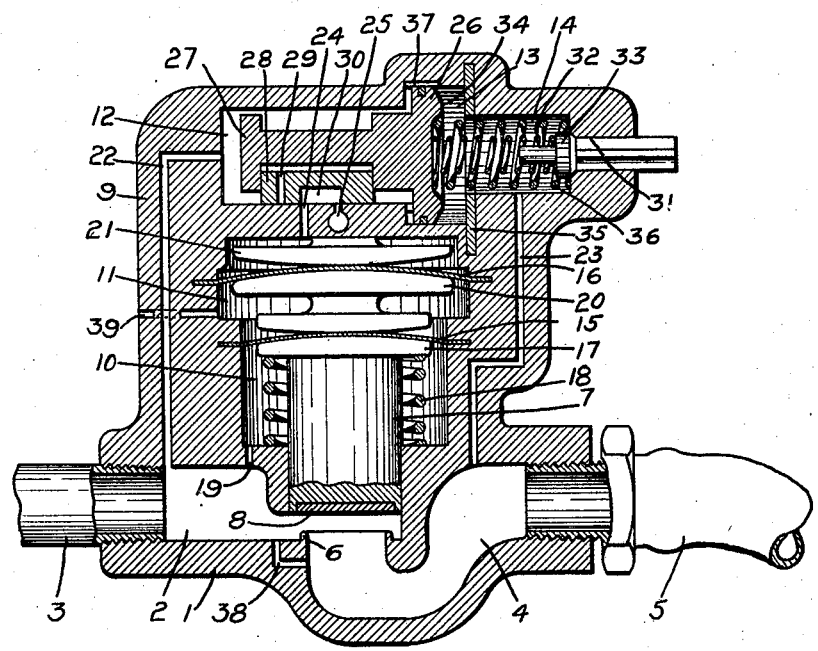
INVENTOR
CLYDE C. FARMER
BY *Wm. M. Cady*
ATTORNEY Patented Nov. 19, 1929

1,736,000

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

ANGLE-COCK DEVICE

Application filed April 9, 1928. Serial No. 268,475.

This invention relates to fluid pressure brakes and more particularly to an angle cock device, such as employed to control communication through the brake pipe of a fluid pressure brake system.

An object of my invention is to provide novel means for controlling the flow of air through the angle cock device, so that an unrestricted passage through the device will be had at all times, except upon the opening of a manually operated vent valve.

Another object of the invention is the provision of a plunger valve for controlling the flow of air through the angle cock, normally held off its seat under the influence of a spring, with means including a pressure controlled piston operated slide valve for governing the flow of fluid under pressure against said plunger valve for moving the same to its seat against said spring, actuation of the piston being caused by release of pressure on one side thereof by the opening of a manually operated vent valve.

A further object of the invention is to provide a fluid pressure operated angle cock device, which will be sensitive to a variation in fluid pressure and which will act substantially instantaneously upon a variation in fluid pressure, said variation in fluid pressure being controlled by a manually operated vent valve.

A still further object of the invention is to provide a pressure operated angle cock device embodying a plunger valve for controlling the flow of air through the device, said plunger valve having associated therewith a pair of opposed diaphragms subject to pressure for closing the valve, the pressure being controlled by a piston operated slide valve, which is in turn actuated by the release of pressure on one side thereof by a manually controlled vent valve.

In the accompanying drawing, the single figure is a diagrammatic sectional view of an angle cock device embodying my invention.

The angle cock device may comprise a casing 1 having a passageway 2 to which is connected the usual brake pipe 3 and a passageway 4 to which is connected the usual flexible hose 5.

Interposed between the passageways 2 and 4 is an annular valve rib seat 6 on which is adapted to seat the inner face of a plunger valve 7. The inner face of this plunger valve can be provided with a set-in washer disk 8 for engaging the seat if desired.

As shown in the present illustration of the invention, the casing is provided with a laterally extending body 9 having formed centrally therein a pair of aligned communicating chambers 10 and 11 of different areas and right angularly extending communicating slide valve, piston and spring chambers 12, 13 and 14.

Spaced diaphragms 15 and 16 are mounted respectively in the chambers 10 and 11 and it is to be noted that the diaphragm 16 is of greater area than the diaphragm 15. The outer end of the plunger valve 7 extends into the chamber 10 and may be provided with an enlarged head 17 for engaging one face of the diaphragm 15.

An expansion spring 18 is placed about the plunger valve and bears against the head 17 thereof and the inner end wall of the chamber 10. This spring 18 normally functions to hold the valve 7 off of its seat to allow free communication to be had between passageways 2 and 4. It is well to note at this point that a small passage 19 connects the passageway 2 with the chamber 10.

A double headed follower 20 is disposed between the diaphragms 15 and 16, so that movement of one will be communicated to the other. A follower 21 is disposed in the chamber 11, between the diaphragm 16 and the end wall of the chamber 11, to limit the movement of this diaphragm in one direction.

A restricted passage 22 is formed in the body and connects the passageway 2 with the slide valve chamber 12, and a similar passage 23 connects the spring chamber 14 with the passageway 4. A port 24 connects the chamber 11 on the outer side of the diaphragm 16 with the slide valve chamber 12 and an atmospheric port 25 is formed in the chamber 12 adjacent to the port 24.

A ring fitted piston 26 is slidably mounted in the piston chamber 13 and the same is provided with a stem 27 which extends into the slide valve chamber 12. This stem carries a slide valve 28, which fits against a flat face formed on the wall of the chamber. The slide valve 28 is provided respectively with a port 29 which extends entirely through the same and a cavity 30 in its lower face. It can be seen that when the slide valve is in one of its positions the port 29 will align or register with the port 24 for establishing communication between chambers 11 and 12 and when the slide valve 28 is in its other position, the cavity 30 connects port 24 with the atmospheric port 25, thereby connecting chamber 11 with the atmosphere on one side of the diaphragm 16.

The spring chamber 14 at one end is provided with an escape or vent port 31 having a valve seat on which is normally held, through the medium of an expansion spring 32, an escape or vent valve 33. This valve 33 is provided with a fluted stem which extends exteriorly of the body, to permit the manual actuation of the vent valve.

It is to be noted that the piston 26 has its outer face provided with a seat rib 34 which is adapted to fit against a sealing washer 35 when the piston is in its outermost position. An expansion spring 36 bears against the face of the piston and functions to move the piston inward, under certain conditions, as will be later described. When the piston is in its inward position, communication is established between chambers 12 and 13 through the medum of a short groove 37 formed in the wall of the cylinder chamber 13 at the inner end thereof.

Under normal conditions, the fluid pressures on opposite sides of the piston 26 are equal, due to the passages 22 and 23, and the spring 36 holds the piston in its inward position, which connects port 24 with atmospheric port 25, through the medium of the slide valve 28. Consequently the pressure of air in chamber 10 and the resiliency of the spring 18 holds the valve 7 off of its seat. This allows free flow of air through the angle cock device.

When it is desired to disconnect a pair of cars fitted with the improved angle cocks, the vent valves 33 on the adjoining cars are pressed inward. The fluid pressure in the spring chamber 14 then reduces faster than it can be built up by flow from the brake pipe, and the pressure on the inner side of the piston 26 moves the piston and attached slide valve 28 outwardly until the piston seals against its atmospheric seal 35. The port 24 leading from the upper face of the diaphragm 16 is then cut off from the atmospheric port 25 and is connected with the chamber 12 and brake pipe pressure through slide valve port 29. The area then exposed to the brake pipe pressure of the outer diaphragm 16 is greater than that of the inner diaphragm 15. The plunger valve 7 is then forced on its seat 6, cutting off the brake pipe from the end of the car.

These movements having taken place, it is then necessary to hold only one vent valve 33 open, and the vent valve on the car being uncoupled can be released, after which the cars can be uncoupled in the usual manner. When the cars are connected together, the brake pipe pressure in the empty car is built up through a small choke passage 38 formed in the casing 1 around the valve seat 6. As soon as the pressure in the empty car equalizes with that on the train, the piston spring 36 forces the piston 26 and slide valve 28 inward, cutting off the supply of air to the outer diaphragm 16 and opening its chamber to the atmosphere, permitting the valve spring 18 to open the valve 7.

The space between the diaphragms 15 and 16 is connected to the atmosphere by means of a passage 39 to eliminate any effects of leakage of air past the diaphragms. In recharging an empty car, the end hose coupling can be provided with a dummy coupling, to prevent escape of air under pressure therethrough.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. An angle cock device comprising a casing having a main passageway therethrough, a normally open valve for controlling the flow of air through said passage, means for seating said valve by pressure, and means for controlling the flow of pressure to said pressure operated means including a piston operated slide valve.

2. An angle cock device comprising a casing having a main passageway therethrough, a normally open valve for controlling the flow of air through said passage, a diaphragm for normally moving the valve on its seat when subjected to pressure, and means for controlling the flow of pressure to said diaphragm.

3. An angle cock device comprising a casing having a main passageway therethrough, a valve for controlling the flow of air through said passageway, an inner and outer diaphragm of different areas, means for communicating movement of one diaphragm to the other and to said valve, said casing having a port connecting the passageway with the diaphragm of less area for normally permitting unseating of said valve, and pressure operated means for controlling the flow of air to the diaphragm of greater area for closing said valve against the pressure on the diaphragm of less area.

4. An angle cock device comprising a casing having a main passageway therethrough, a valve for controlling the flow of air through said passageway, an inner and outer diaphragm of different areas, means for communicating movement of one diaphragm to the other and to said valve, said casing having a port connecting the passageway with the diaphragm of less area for normally permitting unseating of said valve, means subject to brake pipe pressure for controlling the flow of air to the diaphragm of greater area for closing said valve against the pressure on the diaphragm of less area, and a manually operable valve for venting fluid under pressure from said air controlling means.

5. An angle cock device comprising a casing having a main passageway therethrough, a valve for controlling the flow of air through said passageway, an inner and outer diaphragm of different areas, means for communicating movement of one diaphragm to the other and to said valve, said casing having a port connecting the passageway with the diaphragm of less area for normally permitting unseating of said valve, a brake pipe pressure controlled piston actuated slide valve for controlling the flow of air to the diaphragm of greater area for closing said valve against the pressure on the diaphragm of less area, and a manually operated valve for venting fluid under pressure from said piston.

6. An angle cock device comprising a casing having a main passageway therethrough, a valve for controlling the flow of air through said passageway, an inner and outer diaphragm of different areas, means for communicating movement of one diaphragm to the other and to said valve, said casing having a port connecting the passageway with the diaphragm of less area for normally permitting unseating of said valve, a brake pipe pressure controlled piston actuated slide valve for controlling the flow of air to the diaphragm of greater area for closing said valve against the pressure on the diaphragm of less area, and a manually operated valve for venting fluid under pressure from said piston, and a normally open choke passage around said first mentioned valve.

7. An angle cock device comprising a casing having a main passageway therethrough, a valve subject to brake pipe pressure for controlling the flow of air through said passageway, means normally tending to hold the valve off of its seat, means subject to brake pipe pressure for controlling the flow of air under pressure to said valve for moving the valve on its seat, and a manually operable valve for venting fluid under pressure from said brake pipe pressure controlling means.

8. An angle cock device comprising a casing having a main passageway therethrough, a valve for controlling the flow of air through said passageway, an inner and outer diaphragm of different areas, means for communicating movement of one diaphragm to the other and to said valve, said casing having a port connecting the passageway with the diaphragm of less area for normally permitting unseating of said valve, a brake pipe pressure controlled piston actuated slide valve for controlling the flow of air to the diaphragm of greater area for closing said valve against the pressure on the diaphragm of less area, and a manually operated valve for venting fluid under pressure from said piston, and an atmospheric seal for said piston upon movement of the piston actuated slide valve upon actuation of the manually operated vent valve.

9. An angle cock device comprising a casing having a main passageway therethrough, valve means subject to brake pipe pressure for controlling the flow of air through said main passageway, means normally tending to move the valve in one direction off of its seat, said casing having a chamber disposed at one end of the valve, a piston operated slide valve in said chamber for controlling the flow of brake pipe pressure to the valve and for venting pressure from the valve to the atmosphere, said casing having a by-pass connecting the opposite ends of the chamber with the main passageway on each side of said valve, whereby pressure on the opposite ends of the piston operated slide valve will be normally equalized, and a manually operated valve for venting fluid under pressure from one side of said piston operated slide valve.

In testimony whereof I have hereunto set my hand.

CLYDE C. FARMER.